United States Patent [19]

Levin et al.

[11] Patent Number: 4,845,157

[45] Date of Patent: Jul. 4, 1989

[54] DIESEL FUEL COMPOSITIONS CONTAINING POLYOLEFIN GRAFT POLYMERS

[75] Inventors: Mark D. Levin, Shaker Heights, Ohio; Constance A. Gallagher, Newburgh, N.Y.; Christopher S. Liu, Poughkeepsie, N.Y.; William A. Buscher, Jr., Hopewell Junction, N.Y.

[73] Assignee: Texaco Inc., White Plains, N.Y.

[21] Appl. No.: 947,199

[22] Filed: Dec. 29, 1986

[51] Int. Cl.$^4$ ............................................. C08F 265/04
[52] U.S. Cl. ..................................... 525/308; 525/63; 525/70
[58] Field of Search .................. 44/62; 525/63, 64, 69, 525/70, 308

[56] References Cited

U.S. PATENT DOCUMENTS

| | | | |
|---|---|---|---|
| 3,404,091 | 10/1968 | Takashima | 44/62 |
| 3,447,915 | 6/1969 | Otto | 44/62 |
| 4,153,644 | 5/1979 | Sugio | 525/92 |
| 4,161,452 | 7/1979 | Stambaugh | 44/62 |
| 4,210,424 | 7/1980 | Feldman | 44/62 |
| 4,211,534 | 7/1980 | Feldman | 44/62 |
| 4,228,258 | 10/1980 | Sugio | 525/390 |
| 4,261,703 | 4/1981 | Tack | 44/62 |
| 4,460,380 | 7/1984 | Rehrer | 44/62 |
| 4,632,959 | 12/1986 | Nagano | 525/63 |
| 4,664,984 | 5/1987 | Klosiewicz | 428/516 |

FOREIGN PATENT DOCUMENTS

| | | | |
|---|---|---|---|
| 48-13349 | 4/1973 | Japan | 525/308 |
| 1042561 | 3/1986 | Japan | 525/64 |
| 2074587 | 11/1981 | United Kingdom | 525/64 |

*Primary Examiner*—William R. Dixon, Jr.
*Assistant Examiner*—James M. Hunter
*Attorney, Agent, or Firm*—Robert A. Kulason; James J. O'Loughlin; Vincent A. Mallare

[57] ABSTRACT

A diesel fuel of improved flow properties at low temperatures which contains a linear, substantially oil-soluble polymer having a carbon-carbon backbone bering a graft moiety derived from, as a graft monomer, an unsaturated-hydrocarbon ester of an ($C_1$–$C_{18}$) alkyl alcohol containing an ethylenically unsaturated carbon-carbon double bond.

17 Claims, No Drawings

DIESEL FUEL COMPOSITIONS CONTAINING POLYOLEFIN GRAFT POLYMERS

FIELD OF THE INVENTION

This invention relates to hydrocarbon fuel additives oils. More particularly, it relates to hydrocarbon diesel fuel additives which contain graft polymers which permit attainment of improved properties in such diesel fuels.

BACKGROUND OF THE INVENTION

As is well known to those skilled in the art, diesel fuels must be formulated, as by addition of various additives, to improve their properties.

In the case of diesel fuel additives typified by those employed in railway, automotive, marine, etc. service, it is found that they become degraded during use due inter alia to formation of sludge which may be generated by deterioration of the diesel fuel or by introduction of undesirable components from other sources including combustion air. In order to maintain and improve the properties of the diesel fuel, various additives have heretofore been provided; and these have been intended to improve the complete burning of the fuel, to remove exhaust particulates, etc.

It is an object of this invention to provide an additive system which permits attainment of improved diesel fuels, particularly as to improving the flow properties of such fuels. Other objects will be apparent to those skilled in the art.

SUMMARY OF THE INVENTION

This invention is generally directed to a linear, substantially oil-soluble polymer having a carbon-carbon backbone bearing a graft moiety derived from, as a graft monomer, an unsaturated-hydrocarbon ester of an ($C_1$-$C_{18}$) alkyl alcohol containing an ethylenically unsaturated carbon-carbon double bond.

Primarily, this invention is directed as a diesel fuel composition comprising a major portion of a diesel fuel and a minor effective amount of, as a flow improver, a linear, substantially oil-soluble polymer having a carbon-carbon backbone bearing a graft moiety derived from, as a graft monomer, an unsaturated-hydrocarbon ester of an ($C_1$-$C_{18}$) alkyl alcohol containing an ethylenically unsaturated carbon-carbon double bond.

DESCRIPTION OF THE INVENTION

THE POLYMER

The charge polymer which may be employed in the practice of the process of this invention may include an oil-soluble, substantially linear, carbon-carbon backbone polymer. Typical carbon-carbon backbone polymers prepared from monomers bearing an ethylenically unsaturated polymerizable double bond which may be employed include homopolymers or copolymers prepared from monomer

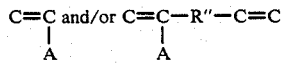

where A may be: hydrogen; a hydrocarbon such as alkyl, or aryl; RCOO— typified by acetate, or a less preferred acyloxy —COOR; halide; and R" may be divalent hydrocarbon typified by alkylene, alkarylene, aralkylene, cycloalkylene or arylene.

Illustrative of such monomers may be acrylates; methacrylates; vinyl halides (such as vinyl chloride); styrene; olefins such as propylene; butylene; vinyl acetate; dienes such as butadiene, isoprene, hexadiene, ethylidenenorbornene. Homopolymers of olefins, (such as polypropylene, or polybutylene), of dienes, (such as hydrogenated polyisoprene), or copolymers of ethylene with e.g. butylene and higher olefins, styrene with isoprene and/or butadiene may be employed. The preferred carbon-carbon backbone polymers include those selected from the group consisting of ethylene-propylene copolymers (EPM or EPR) and ethylenepropylene-third monomer terpolymers (EPDM or EPT).

When the charge polymer is a terpolymer of ethylenepropylene-diene (EPT or EPDM), it may be formed by copolymerization of ethylene, propylene, and diene. The diene monomer is commonly a non-conjugated diene typified by dicyclopentadiene; 1,4-hexadiene; or ethylidene-norbornene. Polymerization is effected under known conditions, preferably Ziegler-Natta reaction conditions. The preferred terpolymers contain units derived from ethylene in amount of from about 40 to about 70 mole %, preferably from about 50 to about 65 mole %, say 60 mole % and units derived from propylene in amount of 20-60 mole %, preferably 30-50 mole % say 32 mole % and units derived from diene third monomer in amount of 0.5-15 mole %, preferably 1-10 mole %, say 2 mole %. The molecular weight $\overline{M}_n$ of the terpolymers may typically be from about 10,000 to about 1,000,000, preferably from about 20,000 to about 200,000, say about 120,000. Molecular weight distribution of the useful polymers is preferably narrow viz a polydispersity index $\overline{M}_w/\overline{M}_n$ of typically less than 15, preferably 1.5–10, say about 2.2.

Illustrative EPT terpolymers which may be employed in the practice of the process of this invention may be those set forth below in Table I, the first listed being preferred.

TABLE I

A. The Epsyn 40A brand of EPT marketed by Copolymer Rubber and Chemical Corp. containing 60 mole % of units derived from ethylene, 37 mole % of units derived from propylene, and 3 mole % of units derived from ethylidenenorbornene and having a $\overline{\text{MHD}}n$ of 140,000 and a polydispersity index of 2.

B. The Epsyn 4006 brand of EPT marketed by Copolymer Rubber and Chemical Corp., containing 58 mole % of units derived from ethylene, 40 mole % of units derived from propylene, and 2 mole % of units derived from ethylidenenorbornene and having a $\overline{M}_n$ of 120,000 and a polydispersity index of 2.2.

C. The Ortholeum 5655 brand of EPT marketed by du Pont containing 62 mole % of units derived from ethylene, 36 mole % of units derived from propylene, and 2 mole % of units derived from 1,4-hexadiene and having a $\overline{M}_n$ of 75,000 and a polydispersity index of 2.

D. The Ortholeum 2052 brand of EPT marketed by du Pont containing 62 mole % of units derived from ethylene, 36 mole % of units derived from propylene, and 2 mole % of units derived from 1,4-hexadiene and having a $\overline{M}_n$ of 35,000 and a polydispersity index of 2.

E. The Royalene brand of EPT marketed by Uniroyal containing 60 mole % of units derived from ethylene, 37 mole % of units derived from propylene, and 3 mole % of units derived from dicyclopentadiene and having a $\overline{M}_n$ of 100,000 and a polydispersity index of 2.5.

When the charge polymer is an ethylene-propylene copolymer (EPM, also called EPR polymers), it may be formed by copolymerization of ethylene and propylene under known conditions, generally comparable to those employed in preparing the EPT products. The preferred EPM copolymers contain units derived from the ethylene in the amount of 40–70 mole %, preferably 50–60 mole %, say 55 mole %, the remainder being derived from propylene.

The molecular weight $\overline{M}_n$ of the EPM copolymers which may be employed may be from about 10,000 to about 1,000,000, preferably from about 20,000 to about 200,000, say about 80,000. The molecular weight distribution may be characterized by a polydispersity index $\overline{M}_w/\overline{M}_n$ of less than about 15, preferably about 1.2 to about 10, say about 1.6.

Illustrative EPM copolymers which may be employed in the practice of the process of this invention may be those set forth below in Table II, the first copolymer listed being preferred.

TABLE II

A. The Epsyn brand of EPM marketed by Copolymer Rubber and Chemical Corporation containing 60 mole % of units derived from ethylene and 40 mole % of units derived from propylene, having a molecular weight $\overline{M}_n$ of 140,000 and a polydispersity index of 1.6.
B. The Epcar 505 brand of EPM marketed by B. F. Goodrich Co., containing 50 mole % of units derived from ethylene and 50 mole % of units derived from propylene and having a $\overline{M}_n$ of 25,000 and a polydispersity index of 2.5.
C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5.

The EPM and EPT polymers may contain minor portions (typically less than about 30%) of other units derived from other copolymerizable monomers.

It is a feature of the process of this invention that there may be grafted onto these oil-soluble, substantially linear carbon-carbon, backbone polymers graft moieties derived from, as graft monomer, an unsaturated-hydrocarbon ester of an ($C_1$–$C_{18}$) alkyl alcohol containing an ethylenically unsaturated carbon-carbon double bond.

THE GRAFT MONOMER

The graft monomer which may be employed may be an ester of a carboxylic acid containing an ethylenically unsaturated carbon-carbon double bond.

Typical acids from which the carboxylic acid portion of this monomer may be derived may include the following listed below in Table III, the first listed being preferred;

TABLE III methacrylic acid
acrylic acid

The alcohol portion of the monomer may be characterized as a residue of an alcohol typified by the following listed below in Table IV, the first listed being

TABLE IV butyl alcohol
ethyl alcohol
propyl alcohol
iso propyl alcohol

The preferred graft monomer may be $$R^*-COO-R^2$$

wherein $R^*$ is a hydrocarbon moiety containing an ethylenically unsaturated carbon-carbon double bond selected from the group consisting of alkenyl, cycloalkenyl, aralkenyl, and alkenaryl and $R^2$ is a hydrocarbon moiety selected from the group consisting of alkyl, aralkyl, alkaryl, cycloalkyl, and aryl. Preferably $R^*$ is $CH_2=C-CH_3$ and $R_2$ is $-CH_2CH_2-CH_2-CH_3$. The preferred graft monomer may be characterized by the formula:

$$CH_2=\underset{\underset{CH_3}{|}}{C}-COO-CH_2=CH_2-CH_2CH_3$$

These charge graft monomers may be prepared by reaction of a saturated alkyl alcohol (such as butyl alcohol) with an unsaturated acid (such as methacrylic acid).

THE GRAFTING REACTION

In practice of this process of this invention, 100 parts of charge EPM or EPT may be added to 100–1000 parts, say 300 parts of solvent. Typical solvent may be a hydrocarbon solvent such as mineral oil, hexane, heptane, or tetrahydrofuran. Preferred solvent may be a mineral oil or commercial hexane containing principally hexane isomers. Reaction mixture may then be heated under nitrogen to reaction conditions of 60° C.–180° C. preferably 150° C.–170° C., say 155° C. When n-hexane or other low boiling solvent is used, reaction is carried out in a pressure reactor at 15–300 psig, preferably 180–220 psig, say 200 psig.

In the preferred process, there are admitted to the reaction mixture graft monomer, typically butylmethacrylate in amount of 1–14 parts, say 5 parts, and a solution in hydrocarbon of free radical initiator. Typical free radical initiators may include/dicumyl peroxide, di-butyl peroxide, benzoyl peroxide, di-isopropyl peroxide, azobisisobutyronitrile, etc. The solvent is preferably the same as that in which the EPR or EPT is dissolved. The initiator may be added in amount of 0.2–10 parts, say 2 parts in 0.8–40 parts, say 16 parts of solvent.

The reaction is carried out at a temperature at least as high as the decomposition temperature of the initiator, typically 60° C. or higher.

Reaction is typically carried out at 60° C.–180° C., say 155° C. for 5–10 hours, say 1 hour during which time graft polymerization of the butylmethacrylate onto the base EPR or EPT polymer occurs. The typical final product graft polymer may be characterized by the presence of the following typical units.

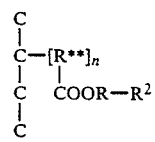

-continued wherein n = 1 wherein R** is a hydrocarbon moiety derived from R* (defined above with $R^2$) by opening up of the double bond during graft polymerization. In the case in which the graft monomer is butylmethacrylate, the product may be

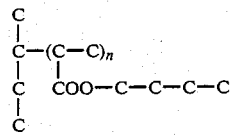

wherein n = 1

The product may be characterized by molecular weight $\overline{M}_n$ ranging from about 10,000 to about 1,000,000, preferably from about 20,000 to about 200,000, say about 80,000. It may contain from about 0.3 mole % to about 20 mole %, preferably about 0.5 to about 10 mole %, say about 2 mole % derived from the graft monomer per 1,000 carbon atoms of the charge backbone polymer. A typical product may be that obtained by grafting butylmethacrylate onto the Epsyn 40A brand of EPT, to yield product of molecular weight $\overline{MHD}$ n of about 120,000 and containing about 2 mole % derived from butylmethacrylate. The graft monomers are an unsaturated hydrocarbon ester of an ($C_1$-$C_{18}$) alcohol containing an ethylenically unsaturated carbon-carbon double bond. According to the present invention, the hydrocarbon moeity, i.e., graft monomer, which is grafted onto the backbone polymer, may include any of the following monomers listed below in Table VI, the first monomer being listed is preferred.

TABLE VI butyl methacrylate
methyl methacrylate
propyl methacrylate
ethyl methacrylate
lauryl methacrylate
stearyl methacrylate
methyl acrylate
ethyl acrylate
propyl acrylate
butyl acrylate
lauryl acrylate
stearyl acrylate As indicated above, the present invention is primarily concerned with providing an additive for improving the flow of diesel fuel which will enable a diesel vehicle to operate at temperatures significantly below the cloud point of the diesel fuel. The cloud point generally ranges from about +15° F. to about +30° F. In tests, as described below in the Examples, the flow improver additives of this invention have shown a significant improvement in the operation of diesel engines and vehicles at low temperatures, i.e., significantly below the cloud point.

DESCRIPTION OF SPECIFIC EMBODIMENTS

The practice and advantage of the use of the present flow improver additives will be apparent to those skilled in the art from the following examples wherein, as elsewhere in this specification, all parts are parts by weight unless otherwise noted

EXAMPLE I

A 1980 Oldsmobile, equipped with a 5.7L diesel engine, and a 1983 Chevrolet Chevette, with a 1.8L diesel, were used to evaluate a flow improver additive consisting of a graft of Epsyn 40A and 6 percent butyl methacrylate, at an active concentration of 400 PTB. For this evaluation, the additive was added to a high cloud point commercial diesel fuel having the following properties:

|  | Cloud Pt. | CFPP* |
| --- | --- | --- |
| Texaco Base Fuel | 23 F | 19 F |
| Base Fuel w/flow improver | 23 F | −8 F |

*CFPP: Cold filter plugging point

The test vehicles were instrumented with bulk fuel (fuel tank) and fuel line at the filter temperature probes. The cars were run on a course of 22 miles. This 22 mile-run resulted in high fuel flow rates with minimal warm-up. The vehicle operations were rated as:

| Normal | no operating problems |
| --- | --- |
| Borderline | slight surging, rough running, and/or loss ff power during the run but with recovery to Normal operation before the end of the run; and |
| Failure | prolonged surging, rough running, loss of power, and/or stalling. |

As a result, borderline operation for the flow improved fuel was encountered at 8° F. and 9° F. for the Olds and Chevette respectively. With the base fuel, the Olds failed at 15° F. and the Chevette gave Borderline operation.

EXAMPLE II

In this Example, the present flow improver additive of Example I above was tested in diesel fuel from El Dorado. This refinery is supplying Topeka and Sante Fe railroads with flow-improved diesel fuel to meet a 0° F. CFPP specification.

As indicated below in Table VII, for the El Dorado fuel. The present flow improver additive gave an on-spec fuel at 50 ppm (active) in one case and at 500 ppm (active) in the other case.

TABLE VII

| Concentration, PPM (Active) of Present Additive | 0 | 50 | 500 |
| --- | --- | --- | --- |
| *CFPP, ° F. | 2 | −2 | −19 |

*CFPP: Cold filter plugging point

From Table VII, it is apparent that the diesel fuels, without any flow improving additive, fail and are not acceptable in providing diesel fuels which can enable diesel vehicles to function/operate at low temperatures, i.e., below the cloud point of the respective fuels.

Although this invention has been illustrated by reference to specific embodiments, it will be apparent to those skilled in the art that various changes and modifications may be made which clearly fall within the scope of this invention.

We claim:

1. A linear, substantially oil-soluble polymer comprising a carbon-carbon backbone bearing a graft moiety derived from, as a graft monomer, an unsaturated-hydrocarbon ester of an ($C_1$–$C_{18}$) alkyl alcohol containing an ethylenically unsaturated carbon-carbon double bond.

2. The linear, substantially oil-soluble polymer of claim 1, wherein said graft monomer is $$R^*\text{—COO—}R^2$$

where $R^*$ is a hydrocarbon moiety containing an ethylenically unsaturated carbon-carbon double bond selected from the group consisting of alkenyl, cycloalkenyl, aralkenyl and alkenaryl, and $R^2$ is a hydrocarbon moiety selected from the group consisting of alkyl, alkaryl, aralkyl, cycloalkyl and aryl.

3. The linear, substantially oil-soluble polymer of claim 1 wherein said graft monomer is butylmethacrylate.

4. The linear, substantially oil-soluble polymer of claim 1, wherein said graft monomer is methyl methacrylate.

5. The linear, substantially oil-soluble polymer of claim 1, wherein said graft monomer is propyl methacrylate.

6. The linear, substantially oil-soluble polymer of claim 1, wherein said graft monomer is ethyl methacrylate.

7. The linear, substantially oil-soluble polymer of claim 1, wherein said graft monomer is lauryl methacrylate.

8. The linear, substantially oil-soluble polymer of claim 1, wherein said graft monomer is stearyl methacrylate.

9. The linear, substantially oil-soluble polymer of claim 1, wherein said graft monomer is methyl acrylate.

10. The linear, substantially oil-soluble polymer of claim 1, wherein said graft monomer is ethyl acrylate.

11. The linear, substantially oil-soluble polymer of claim 1, wherein said graft monomer is propyl acrylate.

12. The linear, substantially oil-soluble polymer of claim 1, wherein said graft monomer is butyl acrylate.

13. The linear, substantially oil-soluble polymer of claim 1, wherein said graft monomer is lauryl acrylate.

14. The linear, substantially oil-soluble polymer of claim 1, wherein said graft monomer is stearyl acrylate.

15. A linear, substantially oil-soluble polymer comprising a carbon-carbon backbone onto which is grafted, as a graft monomer, an unsaturated-hydrocarbon ester of an ($C_2$–$C_4$) alcohol containing an ethylenically unsaturated carbon-carbon double bond.

16. The linear, substantially oil-soluble polymer of claim 15, wherein said graft monomer is $$R^*\text{—COO—}R^2$$

where $R^*$ is a hydrocarbon moiety containing an ethylenically unsaturated carbon-carbon double bond selected from the group consisting of alkenyl, cycloalkenyl, aralkenyl and alkenaryl, and $R^2$ is a hydrocarbon moiety selected from the group consisting of alkyl, alkaryl, aralkyl, cycloalkyl and aryl.

17. The linear, substantially oil-soluble polymer of claim 16, wherein said graft monomer is butylmethacrylate.

* * * * *